(12) United States Patent
Abe et al.

(10) Patent No.: US 11,876,448 B2
(45) Date of Patent: Jan. 16, 2024

(54) BOOSTER CIRCUIT PERFORMING FEEDBACK CONTROL OF OUTPUT VOLTAGE

(71) Applicant: Yokogawa Electric Corporation, Tokyo (JP)

(72) Inventors: Taisuke Abe, Musashino (JP); Takeki Satou, Musashino (JP); Takumi Sakurai, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 53 days.

(21) Appl. No.: 17/673,350

(22) Filed: Feb. 16, 2022

(65) Prior Publication Data

US 2022/0294341 A1    Sep. 15, 2022

(30) Foreign Application Priority Data

Mar. 15, 2021    (JP) .................... 2021-041472

(51) Int. Cl.
  *H02M 3/156*    (2006.01)
(52) U.S. Cl.
  CPC .................... *H02M 3/156* (2013.01)
(58) Field of Classification Search
  CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081;
(Continued)

(56) References Cited

U.S. PATENT DOCUMENTS 6,774,612 B1    10/2004   Ballenger et al.
8,928,305 B2 *    1/2015   Ueunten ............... H02M 3/158
                                                 323/313
(Continued)

FOREIGN PATENT DOCUMENTS

JP    2010-57222 A    3/2010

OTHER PUBLICATIONS

Tong GR et al: "Power Supply Noise in Bang-Bang Control Class D Amplifier", Circuits and Systems, School of Electrical and Electronic Engineering, Nanyang Technological University, 2007, pp. 701-704; Cited in Search Report issued in European Patent Application No. 22156833.0 on Aug. 12, 2022.

*Primary Examiner* — Jeffrey A Gblende

(57) ABSTRACT

A booster circuit includes a boost converter configured to boost an input voltage and performs feedback control such that an output voltage becomes a set value on the basis of a voltage applied to a feedback terminal and an internal feedback reference voltage, a power supply unit configured to generate a reference voltage with a smaller error than the feedback reference voltage, and a control unit configured to compare a voltage corresponding to the output voltage of the boost converter with the reference voltage, and configured to output a control signal indicating a comparison result to the feedback terminal of the boost converter.

9 Claims, 4 Drawing Sheets

(58) Field of Classification Search
CPC .......... H02M 5/293; H02M 7/12; H02M 3/10;
H02M 3/125; H02M 3/13; H02M 3/135;
H02M 3/145; H02M 3/15; H02M 3/155;
H02M 3/156; H02M 3/157; H02M 3/158;
H02M 1/346; H02M 3/1588; H02M
2003/1566; H02M 3/1582; H02M 3/1584;
H02M 2003/1557; H02M 1/0032; H02M
1/4225; H02M 7/217; H02M 1/0025;
H02M 1/0045; H05B 39/048; B23K
11/24; H04B 2215/069
See application file for complete search history.

(56) References Cited

U.S. PATENT DOCUMENTS

| | | | |
|---|---|---|---|
| 9,425,689 B2* | 8/2016 | Li | H02M 3/156 |
| 10,135,341 B1* | 11/2018 | Liu | H02M 1/32 |
| 10,230,295 B2* | 3/2019 | Belvedere | H02M 1/08 |
| 2010/0052627 A1 | 3/2010 | Otsuka et al. | |

* cited by examiner

FIG. 3

| PERIOD | MAGNITUDE RELATIONSHIP BETWEEN Vout AND Vs | MAGNITUDE RELATIONSHIP BETWEEN Vb AND Vx | Vc | MAGNITUDE RELATIONSHIP BETWEEN Vd AND Vref | OPERATION OF BOOSTER CONVERTER |
|---|---|---|---|---|---|
| T1 | Vout<Vs | Vb<Vx | NEGATIVE POWER SUPPLY | Vd<Vref | OPERATION OF RAISING Vout |
| T2 | Vout=Vs | Vb=Vx | — | Vd=Vref | MAINTAIN CURRENT Vout |
| T3 | Vout>Vs | Vb>Vx | POSITIVE POWER SUPPLY | Vd>Vref | OPERATION OF LOWERING Vout |

# BOOSTER CIRCUIT PERFORMING FEEDBACK CONTROL OF OUTPUT VOLTAGE

BACKGROUND

Field of the Invention

The present invention relates to a booster circuit.

Priority is claimed on Japanese Patent Application No. 2021-041472, filed on Mar. 15, 2021, the contents of which are incorporated herein by reference.

Description of Related Art

A booster circuit is a circuit that boosts an input voltage to a desired output voltage. For example, for a plant, a booster circuit for boosting a power supply voltage of 5 [V] to 25 [V], which is a voltage required to operate field devices, is used. Japanese Unexamined Patent Application Publication No. 2010-057222 discloses a boost converter that boosts a power supply voltage and controls the boosted output voltage to a set value through feedback control.

Incidentally, many boost converters have a control IC (Integrated Circuit) that performs the feedback control mentioned above. In such a boost converter, the feedback control is performed such that an output voltage becomes a set value on the basis of a voltage input to a feedback terminal (FB terminal) of a control IC and a feedback reference voltage which is an internal reference voltage of the control IC. However, in such a boost converter, in a case in which an error of the feedback reference voltage is large, there is a problem that the output voltage deviates greatly from the set value.

SUMMARY

A booster circuit may include a boost converter configured to boost an input voltage and perform feedback control such that an output voltage becomes a set value on the basis of a voltage applied to a feedback terminal and an internal feedback reference voltage, a power supply unit configured to generate a reference voltage with a smaller error than the feedback reference voltage, and a control unit configured to compare a voltage corresponding to the output voltage of the boost converter with the reference voltage, and configured to output a control signal indicating a comparison result to the feedback terminal of the boost converter.

Further features and aspects of the present disclosure will become apparent from the following detailed description of exemplary embodiments with reference to the attached drawings.

BRIEF DESCRIPTION OF THE DRAWINGS

FIG. 3 is a diagram showing an operation of the booster circuit according to the first embodiment.

DETAILED DESCRIPTION OF THE INVENTION

Figure 1:
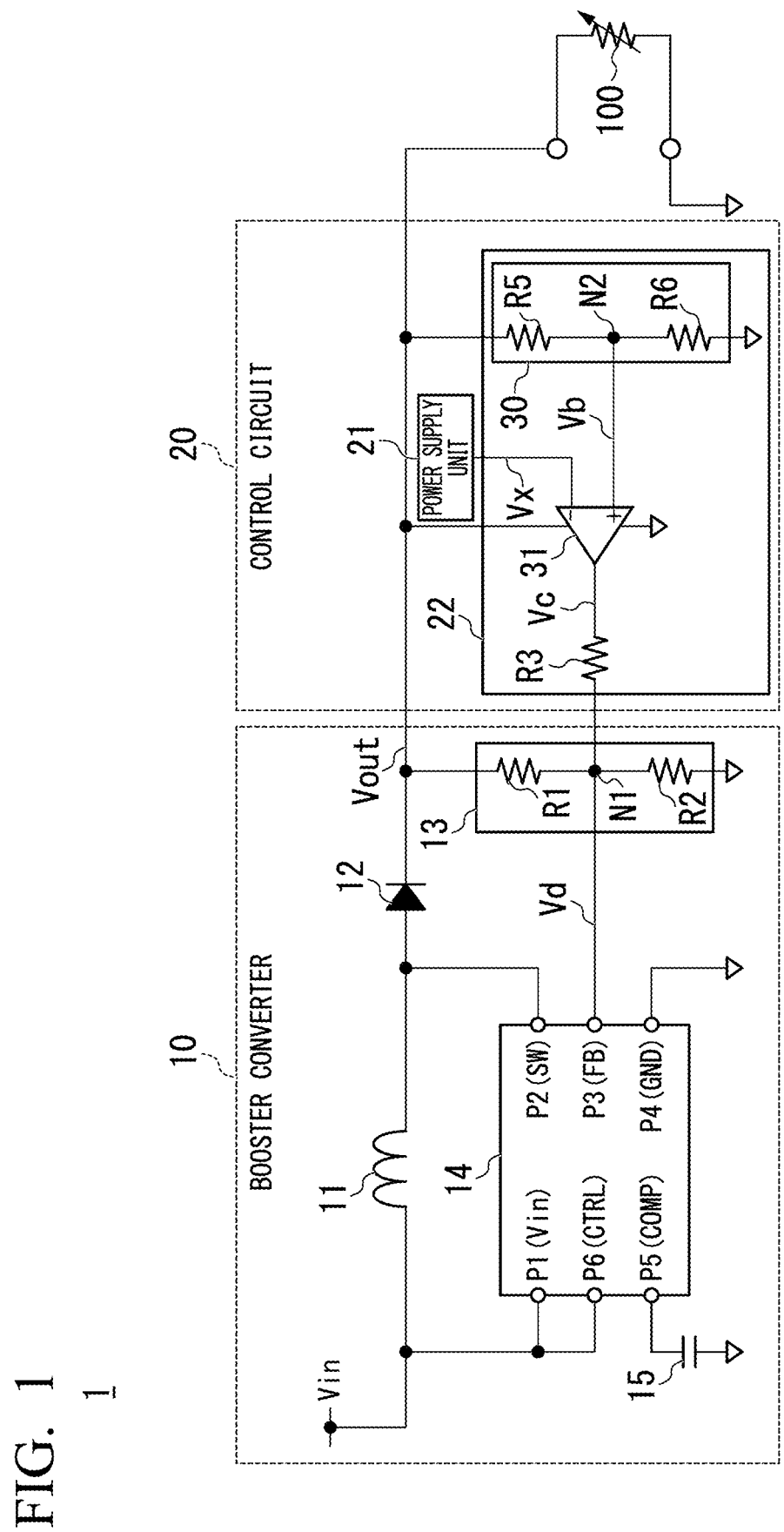
FIG. 1 is a block diagram showing a main configuration of a booster circuit according to a first embodiment.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a booster circuit in which an output voltage can be caused to coincide with a set value with high accuracy.

Booster circuits according to embodiments of the present invention will be described in detail below with reference to the drawings. Hereinafter, an outline of the embodiments of the present invention will be described first, and then details of each embodiment of the present invention will be described.

[Outline]

An embodiment of the present invention provides a booster circuit in which an output voltage Vout can be caused to coincide with a set value Vs with high accuracy. Specifically, even when there is an error in a feedback reference voltage in a boost converter provided in the booster circuit, the output voltage Vout is caused to coincide with the set value Vs with high accuracy.

Some boost converters have a control IC that performs feedback control in order to set the output voltage Vout to the set value Vs. This control IC has a feedback terminal and performs the feedback control to cause the output voltage Vout to be the set value Vs on the basis of a voltage corresponding to the output voltage Vout input to the feedback terminal and a feedback reference voltage Vref, which is a reference voltage inside the control IC.

As an example, the voltage input to the feedback terminal is generated by dividing the output voltage Vout by resistance with two resistors R1 and R2. In this case, the output voltage Vout controlled by the control IC is represented by the following expression (1).

$$Vout = Vref \times \left(\frac{R1}{R2} + 1\right) \quad (1)$$

In order to maintain the output voltage Vout at the set value Vs, high-precision resistors are used for the resistor R1 and the resistor R2. However, even if high-precision resistors are used for the resistors R1 and R2 of the resistance voltage divider, the output voltage Vout will fluctuate greatly in a case in which the error of the feedback reference voltage Vref is large. As a result, the output voltage Vout may deviate from the set value Vs, and the output voltage Vout may not be maintained at the set value Vs.

In addition, some control ICs have a control terminal (CTRL terminal). For example, a pulse width modulation (PWM) signal is input to the control terminal, and the control IC controls the output voltage Vout on the basis of a duty ratio of the PWM signal. As an example, the output voltage Vout is represented by the following expression (2) using a voltage (hereinafter referred to as a "feedback voltage Vfb") obtained by multiplying the feedback reference voltage Vref by the duty ratio of the PWM signal.

$$V_{FB} = Vref \times \text{Duty} \quad (2)$$

$$Vout = V_{FB} \times \left(\frac{R2}{R1} + 1\right)$$

However, in this case, the output voltage Vout should be measured by an ADC or the like, and the duty ratio of the PWM signal for maintaining the measured output voltage at the set value Vs should be calculated, which complicates control processing. Here, if the output voltage Vout is controlled on the basis of the duty ratio of the PWM signal, the error of the feedback reference voltage Vref is corrected, and thus the output voltage Vout can be maintained at the set value Vs. However, in a case in which the error of the feedback reference voltage Vref changes with temperature (in a case in which there is temperature drift), the output voltage Vout should be measured by an ADC or the like at any time to calculate the duty ratio of the PWM signal, which further complicates the control processing.

The embodiment of the present invention includes a control unit which has a power supply unit that generates a reference voltage having a lower error than the feedback reference voltage Vref and compares an output voltage of the boost converter or a voltage based on the output voltage with the reference voltage to output a control signal indicating a comparison result to the feedback terminal. Thus, the booster circuit of the embodiment of the present invention can be controlled with high accuracy to cause the output voltage Vout to be the set value Vs regardless of the error of the feedback reference voltage Vref.

First Embodiment

FIG. 1 is a block diagram showing a main configuration of the booster circuit 1 of the first embodiment. As shown in FIG. 1, the booster circuit 1 includes, for example, a boost converter 10 and a control circuit 20. Also, "connection" described below is electrical connection. Electrical connection means that electric power or electric signals can be transmitted directly or indirectly. Electrical connection may be connection via components such as cables, resistors, capacitors, diodes, switches, and the like.

The boost converter 10 includes a coil (inductor) 11, a diode 12, a first voltage dividing unit 13, and a control IC 14.

One end of the coil 11 is connected to an external power source that outputs a power supply voltage Vin, and another end thereof is connected to an anode of the diode 12. A cathode of the diode 12 is connected to the first voltage dividing unit 13.

The first voltage dividing unit 13 is connected between the cathode of the diode 12 and a ground (GND). The first voltage dividing unit 13 divides an output voltage Vout of the boost converter 10 by resistance and outputs the voltage divided by resistance (hereinafter referred to as a "first voltage") to a feedback terminal P3 of a control terminal IC. For example, the first voltage dividing unit 13 has a resistor R1 and a resistor R2 connected in series with each other.

The control IC 14 includes a control power supply terminal P1 (Vin), a switching terminal P2 (SW), the feedback terminal P3 (FB), a ground terminal P4 (GND), a voltage error detection and compensation terminal P5 (COMP), and a control terminal P6 (CTRL).

The control power supply terminal P1 is a terminal to which the power supply voltage Vin is input. The control IC 14 is operated by the power supply voltage Vin input to the control power supply terminal P1. The switching terminal P2 is connected to another end of the coil 11. A connection point N1 between the resistor R1 and the resistor R2 is connected to the feedback terminal P3, and the first voltage generated by the resistance division of the first voltage dividing unit 13 is input.

The ground terminal P4 is connected to the ground. The ground is connected to the voltage error detection and compensation terminal P5 via a capacitor 15. The control terminal P6 is connected to the control power supply terminal P1.

The control IC 14 of the present embodiment includes a switching element that turns on or off between the switching terminal P2 and the ground. The control IC 14 performs feedback control for bringing the output voltage Vout closer to the set value Vs. The set value Vs is, for example, a voltage to be applied to a load 100. The load 100 is, for example, an electronic device such as a field device. The field device may be, for example, a vortex flow meter, a temperature sensor, a valve device such as a flow control valve or an on-off valve, an actuator device such as a fan or a motor, or other devices installed on site at a plant.

The control IC 14 performs the feedback control to cause the output voltage Vout to be the set value Vs by turning on and off the switching element in the control IC 14 on the basis of the voltage input to the feedback terminal P3 and the feedback reference voltage Vref inside the control IC 14. The boost converter 10 turns on the switching element in the control IC 14 to store electric energy in the coil 11 and turns off the switching element to discharge the electric energy stored in the coil 11. Thus, the boost converter 10 can boost the power supply voltage Vin to generate the output voltage Vout.

The control circuit 20 includes, for example, a power supply unit 21 and a control unit 22.

The power supply unit 21 generates a reference voltage Vx. An error of the reference voltage Vx is smaller than an error of the feedback reference voltage Vref. For example, the power supply unit 21 may generate the reference voltage Vx on the basis of the power supply voltage Vin.

The control unit 22 compares the output voltage Vout of the boost converter 10a or a voltage based on the output voltage Vout with the reference voltage Vx and outputs a control signal indicating a comparison result to the feedback terminal P3 of the boost converter 10a.

The control unit 22 includes a second voltage dividing unit 30, a comparator 31, and a resistor R3.

The second voltage dividing unit 30 generates a voltage (hereinafter referred to as a "second voltage") Vd based on the output voltage Vout by dividing the output voltage Vout by resistance. For example, the second voltage dividing unit 30 has the resistor R5 and a resistor R6 connected in series with each other.

The comparator 31 compares the second voltage Vb generated by the second voltage dividing unit 30 with the reference voltage Vx generated by the power supply unit 21. Then, the comparator 31 outputs a comparison result between the second voltage Vb and the reference voltage Vx from an output terminal thereof. For example, a connection point N2 between the resistor R5 and the resistor R6 is connected to a positive electrode input terminal of the comparator 31, and the second voltage Vb is input thereto. The power supply unit 21 is connected to a negative electrode input terminal of the comparator 31, and a reference voltage Vx is input thereto. The output terminal of the comparator 31 is connected to the feedback terminal P3 via the resistor R3. In the example shown in FIG. 1, a positive power supply terminal of the comparator 31 is connected to the cathode of the diode 12, and a negative power supply terminal of the comparator 31 is connected to the ground.

For example, in a case in which the reference voltage Vx exceeds the second voltage Vb, the comparator 31 outputs an H level (for example, a positive power supply voltage) signal to the feedback terminal P3. For example, in a case in which the reference voltage Vx is equal to or lower than the second voltage Vb, the comparator 31 outputs an L level (for example, a negative power supply voltage) control signal to the feedback terminal P3. Also, the output voltage of the comparator 31 is referred to as a voltage Vc, and the voltage input to the feedback terminal P3 is referred to as a voltage Vd.

Figure 2:
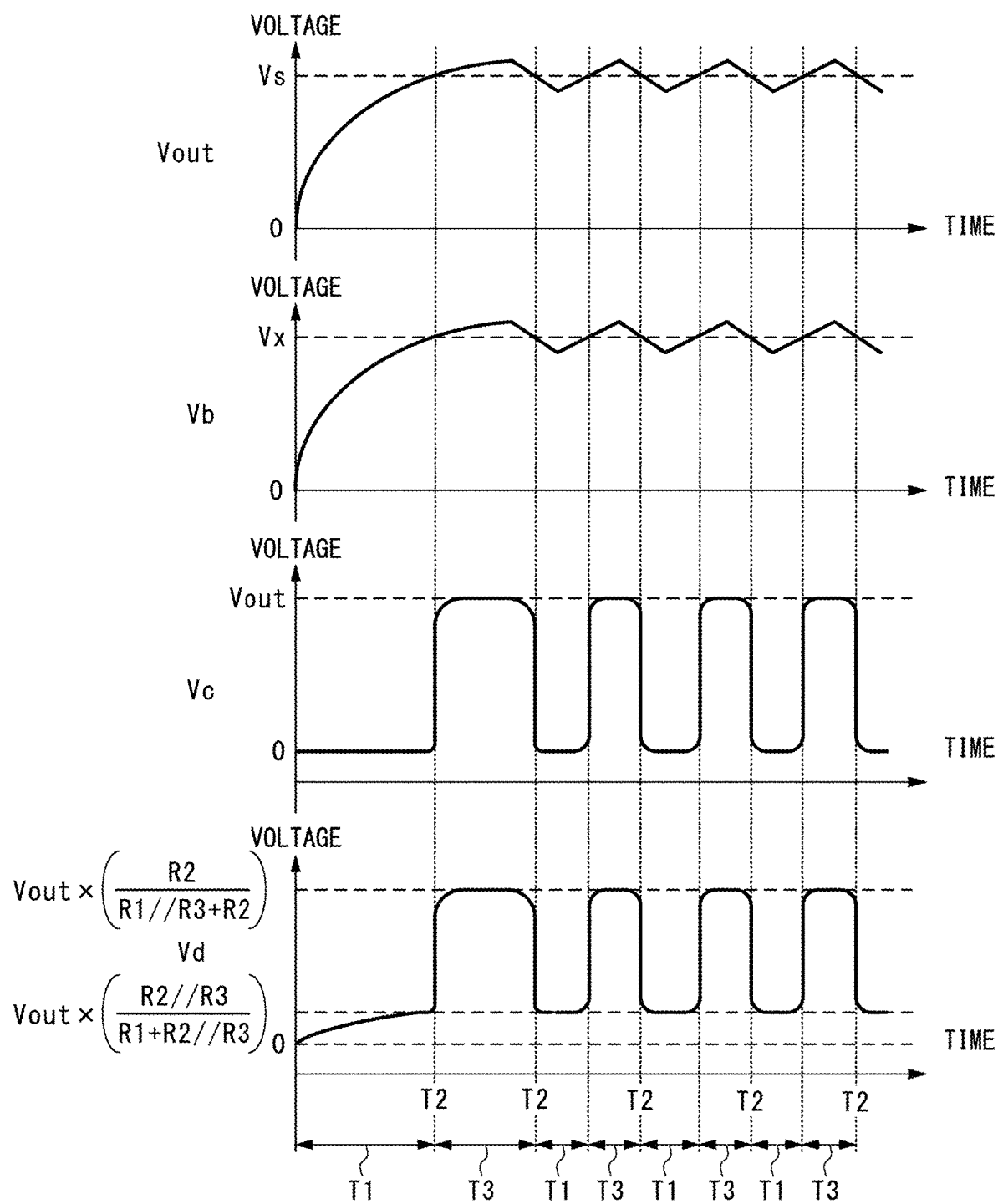
FIG. 2 is a diagram showing each voltage waveform of an output voltage Vout, a second voltage Vb, a voltage Vc, and a voltage Vd after power is supplied according to the first embodiment.

An operation of the booster circuit 1 after power is supplied will be described below with reference to FIGS. 2 and 3. FIG. 2 shows each voltage waveform of the output voltage Vout, the second voltage Vb, the voltage Vc, and the voltage Vd after power is supplied according to the first embodiment. FIG. 3 shows an operation of the booster circuit according to the first embodiment. When the power supply voltage Vin is supplied to the booster circuit 1, the boost converter 10 operates to cause the output voltage Vout to be a set value represented by the following expression (3). Also, (R2//R3) indicates a combined resistance when the resistor R2 and the resistor R3 are connected in parallel.

$$\text{Set value} = Vref \times \left( \frac{R1}{R2//R3} + 1 \right) \tag{3}$$

In addition, when the power supply voltage Vin is input to the booster circuit 1, the control circuit 20 outputs a control signal to the feedback terminal P3 to cause the output voltage Vout to be the set value Vs represented by the following expression (4).

$$\text{Set value} = Vx \times \left( \frac{R5 + R6}{R6} \right) \tag{4}$$

Here, the operation of the booster circuit 1 is roughly classified into three operations of a first operation, a second operation, and a third operation. First, the first operation will be described.

(First Operation)

The first operation is an operation in a period (period T1) in which the output voltage Vout is lower than the set value Vs (Vout<Vs). In a case in which the output voltage Vout is lower than the set value Vs, the second voltage Vb becomes smaller than the reference voltage Vx. For that reason, the comparator 31 outputs the voltage Vc at a negative power supply voltage level. As a result, the voltage Vd of the control signal represented by the following expression (5) is applied to the feedback terminal P3.

$$Vd = Vout \times \left( \frac{R2//R3}{R1 + R2//R3} \right) \tag{5}$$

The voltage Vd shown in the expression (5) is a value lower than the feedback reference voltage Vref. For that reason, the control IC 14 operates to raise the output voltage Vout so that there is no error between the voltage Vd and the feedback reference voltage Vref.

(Second Operation)

The second operation is an operation in a period (period T2) in which the output voltage Vout is the same voltage value as the set value Vs (Vout=Vs). In a case in which the output voltage Vout has the same voltage value as the set value Vs, the second voltage Vb has the same voltage value as the reference voltage Vx. In this case, the voltage Vd applied to the feedback terminal P3 is the same as the feedback reference voltage Vref, and thus the control IC 14 operates to maintain the current output voltage Vout.

(Third Operation)

The third operation is an operation in a period (period T3) in which the output voltage Vout is higher than the set value Vs (Vout>Vs). In a case in which the output voltage Vout is higher than the set value Vs, the second voltage Vb is higher than the reference voltage Vx. For that reason, the comparator 31 outputs the voltage Vc at a positive power supply voltage level. As a result, the voltage Vd of the control signal represented by the following expression (6) is applied to the feedback terminal P3.

$$Vd = Vout \times \left( \frac{R2}{R1//R3 + R2} \right) \tag{6}$$

The voltage Vd shown in the expression (6) is a value higher than the feedback reference voltage Vref. For that reason, the control IC 14 operates to lower the output voltage Vout so that there is no error between the voltage Vd and the feedback reference voltage Vref.

As described above, the booster circuit 1 of the present embodiment includes the boost converter 10 that boosts the power supply voltage Vin and controls the boosted output voltage Vout to the set value Vs through the feedback control, the power supply unit 21 that generates the reference voltage Vx, and the control unit 22 that compares the output voltage Vout of the boost converter 10 or the voltage based on the output voltage Vout (for example, the second voltage Vb) with the reference voltage Vx and outputs the control signal indicating the comparison result to the feedback terminal Vb of the boost converter 10. Thus, in a case in which the error of the feedback reference voltage Vref is large, it is possible to inhibit the output voltage Vout from deviating significantly from the set value Vs.

Second Embodiment

Figure 4:
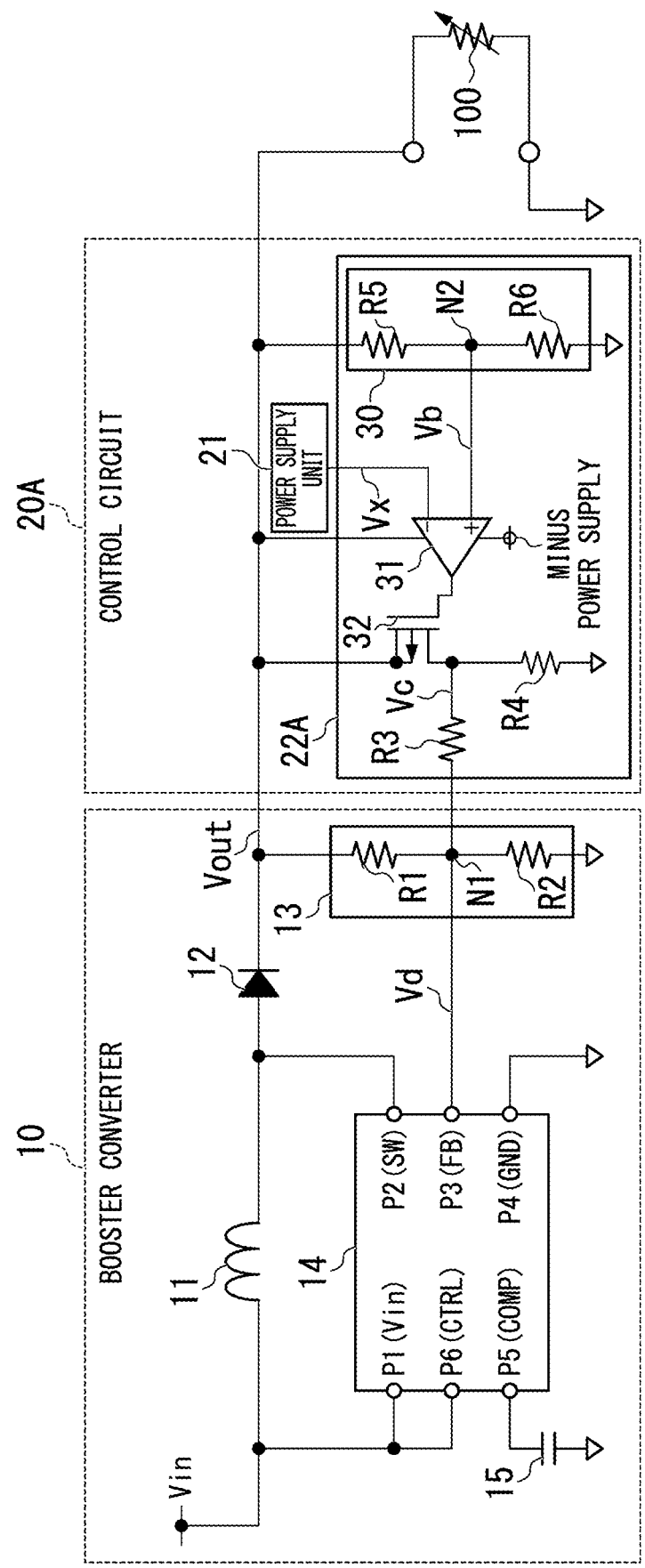
FIG. 4 is a block diagram showing a main configuration of a booster circuit according to a second embodiment.

FIG. 4 is a block diagram showing a main configuration of a booster circuit according to a second embodiment of the present invention. Also, in FIG. 4, the same constituent elements as those shown in FIG. 1 will be denoted by the same reference numerals. In addition, as shown in FIG. 4, a booster circuit 2 of the present embodiment has a configuration in which a switching element 32 is added to the output of the comparator 31 as compared with the booster circuit 1 shown in FIG. 1.

Here, in the booster circuit 1 of the first embodiment described above, in a case in which a minus power supply is used as the negative power supply of the comparator 31, a minus voltage may be applied to the feedback terminal P3 at the time of activating. The booster circuit 1 of the present embodiment prevents a minus voltage from being applied to the feedback terminal P3 even in a case in which a minus power supply is used as the negative power supply of the comparator 31 by adding the switching element 32 to the output of the comparator 31 to keep the voltage Vd at a positive voltage level at all times.

The booster circuit 2 includes the boost converter 10 and a control circuit 20A. The control circuit 20A includes, for example, the power supply unit 21 and a control unit 22A. The control unit 22A includes, for example, the second voltage dividing unit 30, the comparator 31, the switching element 32, the resistor R3, and the resistor R4.

The switching element 32 has a control terminal connected to the output terminal of the comparator 31, an input terminal to which the output voltage Vout is applied, and an output terminal connected to the feedback terminal P3. The switching element 32 is in an open state (off) or a closed state (on) between the input terminal and the output terminal depending on a voltage applied to the control terminal. For example, the switching element is a Pch metal-oxide-semiconductor field effect transistor (MOSFET). In this case, the control terminal is a gate terminal, the input terminal is a source terminal, and the output terminal is a drain terminal. The output terminal is connected to the ground via the resistor R4.

Also, an operation of the booster circuit 2 is different from that of the first embodiment in that a component of the resistance value of the resistor R4 is included in the expression (5) and the expression (6), and other points are the same.

As described above, the booster circuit 2 of the present embodiment is different only in that the switching element 32 and the resistor R4 are provided in the booster circuit 1 of the first embodiment, and a basic configuration thereof is the same as that of the booster circuit 1 of the first embodiment. For this reason, also in the present embodiment, in a case in which the error of the feedback reference voltage Vref is large, it is possible to inhibit the output voltage Vout from deviating significantly from the set value Vs. Further, even in a case in which a minus power supply is used as the negative power supply of the comparator 31, it is possible to prevent a minus voltage from being applied to the feedback terminal P3 during the first operation or the like.

Although the booster circuits according to the embodiments of the present invention have been described above, the present invention is not limited to the above embodiments and can be freely changed within the scope of the present invention. For example, in the booster circuit 1 of the first embodiment and the booster circuit 2 of the second embodiment, the power supply voltage Vin may be used as the positive power supply of the comparator 31.

Also, in the second embodiment, a minus power supply is used as the negative power supply of the comparator 31, but the terminal of the negative power supply may be connected to the ground as in the first embodiment.

In addition, in the booster circuit 1 of the first embodiment and the booster circuit 2 of the second embodiment, the comparator 31 may be a hysteresis comparator or an operational amplifier.

Further, the booster circuit 1 of the first embodiment and the booster circuit 2 of the second embodiment do not have to include the second voltage dividing unit 30. In this case, the comparator 31 compares the output voltage Vout with the reference voltage Vx generated by the power supply unit 21.

[Supplementary Note]

A booster circuit according to one aspect of the present invention may include a boost converter configured to boost an input voltage and perform feedback control such that an output voltage becomes a set value on the basis of a voltage applied to a feedback terminal and an internal feedback reference voltage, a power supply unit configured to generate a reference voltage with a smaller error than the feedback reference voltage, and a control unit configured to compare a voltage corresponding to the output voltage of the boost converter with the reference voltage, and configured to output a control signal indicating a comparison result to the feedback terminal of the boost converter.

Also, the booster circuit according to one aspect of the present invention may further include a first voltage dividing unit configured to divide the output voltage by resistance, and configured to output the voltage divided by resistance to the feedback terminal.

Also, in the booster circuit according to one aspect of the present invention, the control unit may include a second voltage dividing unit configured to generate a voltage corresponding to the output voltage by dividing the output voltage by resistance, and a comparator configured to compare the voltage generated by the second voltage dividing unit with the reference voltage.

Also, in the booster circuit according to one aspect of the present invention, an output terminal of the comparator may be electrically connected to the feedback terminal.

Also, in the booster circuit according to one aspect of the present invention, the control unit may further include a switching element that may include a control terminal connected to the output terminal of the comparator, an input terminal to which the output voltage is applied, and an output terminal connected to the feedback terminal. A state between the input terminal and the output terminal may be caused to be an open state or a closed state by the voltage applied to the control terminal.

Also, in the booster circuit according to one aspect of the present invention, the boost converter may include a control IC (Integrated Circuit) which comprises the feedback terminal, and the control IC may perform the feedback control to cause the output voltage to be the set value on the basis of the voltage input to the feedback terminal and the feedback reference voltage.

Also, in the booster circuit according to one aspect of the present invention, the boost converter further include a diode configured to output the output voltage to the control unit, and a coil of which one end is connected to an external power source that outputs a power supply voltage and of which another end is connected to an anode of the diode.

Also, in the booster circuit according to one aspect of the present invention, the control IC may further include a control power supply terminal to which the power supply voltage is input and connected to one end of the coil, and a switching terminal which is connected to another end of the coil.

Also, in the booster circuit according to one aspect of the present invention, the control IC may further include a switching element configured to turn on or off between the switching terminal and a ground, and the boost converter may be configured to turn on the switching element to store electric energy in the coil, and the boost converter is configured to turn off the switching element to discharge the electric energy stored in the coil.

Also, in the booster circuit according to one aspect of the present invention, a positive electrode input terminal of the comparator may be connected to the second voltage dividing unit, a negative electrode input terminal of the comparator may be connected to the power supply unit, a positive power supply terminal of the comparator may be connected to a cathode of the diode, and a negative power supply terminal of the comparator may be connected to a ground.

Also, in the booster circuit according to one aspect of the present invention, the set value may be a voltage to be applied to a load connected to the booster circuit, and the load may be a field device installed in a plant.

As described above, according to the present invention, an effect that the output voltage can be caused to coincide with the set value with high accuracy is provided.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A booster circuit comprises:
   a boost converter configured to boost an input voltage and perform feedback control such that an output voltage becomes a set value on the basis of a first voltage applied to a feedback terminal and an internal feedback reference voltage; and
   a control circuit comprising:
      a power supply unit configured to generate a reference voltage with a smaller error than the feedback reference voltage; and
      a control unit comprising:
         a second voltage dividing unit configured to generate a second voltage corresponding to the output voltage by dividing the output voltage by resistance; and
         a comparator configured to compare the second voltage generated by the second voltage dividing unit with the reference voltage, and configured to output a voltage indicating a comparison result,
   wherein the boost converter comprises:
      a first voltage dividing unit configured to divide the output voltage by resistance and output the first voltage according to the voltage indicating the comparison result of the comparator to the feedback terminal.

2. The booster circuit according to claim 1,
wherein an output terminal of the comparator is electrically connected to the feedback terminal.

3. The booster circuit according to claim 1,
wherein the control unit further comprises a switching element that comprises:
   a control terminal connected to the output terminal of the comparator;
   an input terminal to which the output voltage is applied; and
   an output terminal connected to the feedback terminal,
wherein a state between the input terminal and the output terminal is caused to be an open state or a closed state by the voltage applied to the control terminal.

4. The booster circuit according to claim 2,
wherein the boost converter comprises a control IC (Integrated Circuit) which comprises the feedback terminal, and the control IC performs the feedback control to cause the output voltage to be the set value on the basis of the voltage input to the feedback terminal and the feedback reference voltage.

5. The booster circuit according to claim 4,
wherein the boost converter further comprises:
   a diode configured to output the output voltage to the control unit; and
   a coil of which one end is connected to an external power source that outputs a power supply voltage and of which another end is connected to an anode of the diode.

6. The booster circuit according to claim 5,
wherein the control IC further comprises:
   a control power supply terminal to which the power supply voltage is input and connected to one end of the coil; and
   a switching terminal which is connected to another end of the coil.

7. The booster circuit according to claim 6,
wherein the control IC further comprises a switching element configured to turn on or off between the switching terminal and a ground, and
wherein the boost converter is configured to turn on the switching element to store electric energy in the coil, and the boost converter is configured to turn off the switching element to discharge the electric energy stored in the coil.

8. The booster circuit according to claim 5,
wherein a positive electrode input terminal of the comparator is connected to the second voltage dividing unit,
wherein a negative electrode input terminal of the comparator is connected to the power supply unit,
wherein a positive power supply terminal of the comparator is connected to a cathode of the diode, and
wherein a negative power supply terminal of the comparator is connected to a ground.

9. The booster circuit according to claim 1,
wherein the set value is a voltage to be applied to a load connected to the booster circuit, and
wherein the load is a field device installed in a plant.

* * * * *